Sept. 29, 1970         R. H. BRYAN         3,530,667
FUEL INJECTOR FOR GAS TURBINE ENGINES
Filed Oct. 28, 1968         2 Sheets-Sheet 1
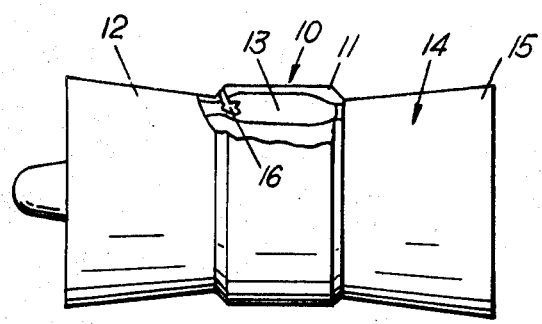
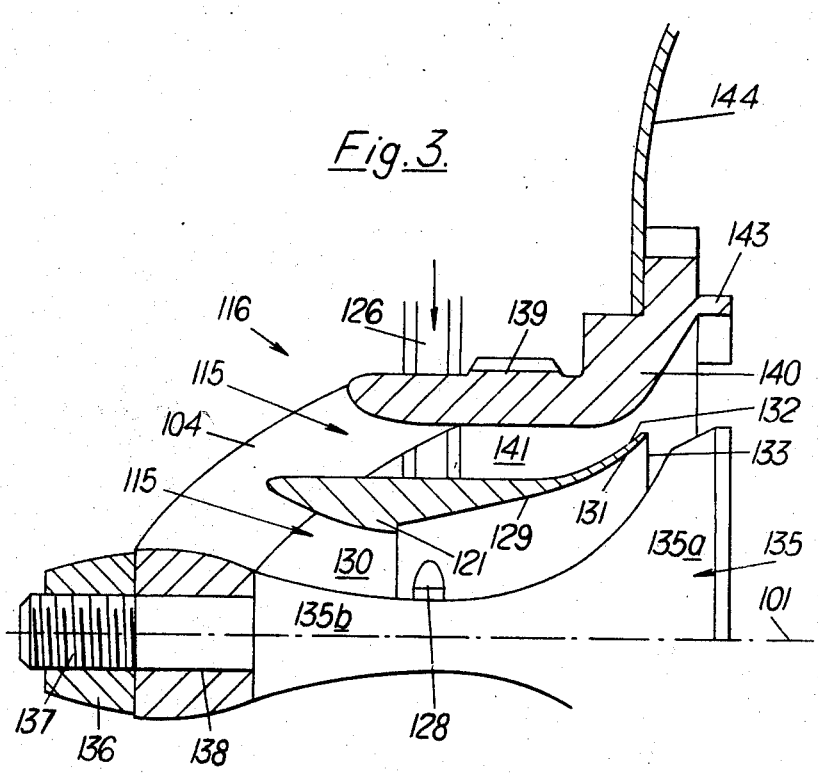
Inventor
ROBERT HOWARD BRYAN
By
Cushman, Darby + Cushman  Attorneys

United States Patent Office 3,530,667
Patented Sept. 29, 1970

3,530,667
FUEL INJECTOR FOR GAS TURBINE ENGINES
Robert Howard Bryan, Belper, England, assignor to Rolls-Royce Limited, Derby, England, a British company
Filed Oct. 28, 1968, Ser. No. 771,025
Claims priority, application Great Britain, Nov. 2, 1967, 49,829/67; Oct. 22, 1968, 50,193/68
Int. Cl. F02c 3/24
U.S. Cl. 60—39.74
12 Claims

ABSTRACT OF THE DISCLOSURE

A fuel injector for a gas turbine engine comprises a hollow central body, an outer body surrounding the central body to define a flow passage therebetween, the flow passage and the interior of the central body being supplied with compressed air, fuel being supplied to the internal surface of the central body to form a fuel annulus flowing downstream therein, means deflecting the flow of fuel and air from said interior towards the air flow from said flow passage, said internal surface having a downstream fuel detachment edge and being shaped to flare radially outwardly towards said edge.

---

Figure 2:
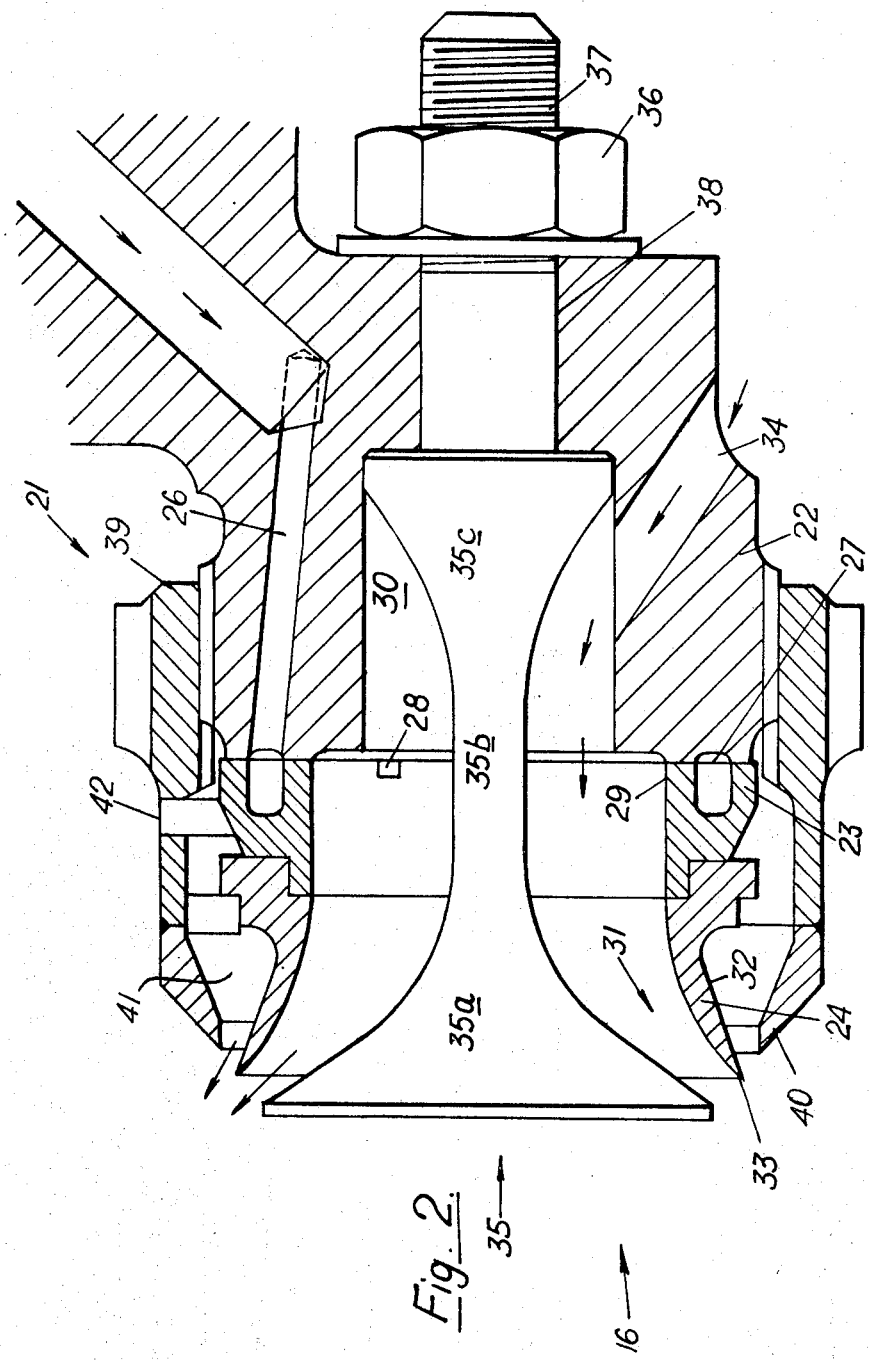

This invention concerns a fuel injector for a gas turbine engine.

According to the present invention, there is provided a fuel injector for a gas turbine engine including a hollow central body, an outer body which at least partly surrounds said central body and defines a flow passage therebetween, said flow passage and the interior of said central body being adapted to be supplied with compressed air, fuel supply means for supplying fuel to the internal surface of the central body to form an unbroken annulus of fuel flowing downstream therein with a given angular velocity, and deflecting means for deflecting the flow of compressed air from said interior in the direction of the flow of compressed air from said flow passage, said internal surface terminating in an edge at which, in operation, substantially all the fuel supplied to the internal surface is detached therefrom, the internal surface having a diameter which gradually increases in a downstream direction and being formed to direct the flow of fuel towards said edge, whereby, in operation, the angular velocity of the fuel flowing along said internal surface towards said edge is reduced.

Said deflecting means is preferably secured to, and mounted coaxially of, said central body and defines an annular flow passage therebetween.

The downstream end portion of said deflecting means may be frusto-conical and may flare radially outwardly, the part of the flow passage between said central body and said frusto-conical downstream end portion having a minimum cross-sectional area in that radial plane which contains said edge.

The said downstream end portion preferably projects downstream of the said edge to an extent which is small compared with the total axial length of the deflecting means.

The external surface of said central body may flare radially outwardly at its downstream end, and the central body is preferably secured to said outer body.

The outer body may terminate at its downstream end upstream of said edge. Alternatively, the downstream end of said outer body may be downstream of said edge. In the latter case, preferably the downstream end of said outer body is provided with at least one cowl to give, in operation, a spray of non-circular section.

The fuel supply may be arranged to direct the fuel tangentially to the said internal surface.

The fuel supply means preferably includes a fuel pipe arranged tangentially with respect to said internal surface, said fuel pipe being readily detachable from said central body.

The invention also includes a gas turbine engine combustion chamber provided with at least one fuel injector as set forth above, said at least one fuel injector being secured to and supported from said combustion chamber.

The invention is illustrated, merely by way of example, in the accompanying drawings, in which:

FIG. 1 is a diagrammatic view, partly in section, of a gas turbine engine provided with a fuel injector in accordance with the present invention, FIG. 2 is a sectional view of such a fuel injector, and FIG. 3 is a view similar to FIG. 2, but showing a modification.

Referring to the drawings, in FIG. 1 there is shown a gas turbine engine 10 having an outer casing 11 within which there are mounted, in flow series, compressor means 12, combustion equipment 13, turbine means 14 and an exhaust assembly 15.

As can be seen more clearly from FIG. 2, the combustion equipment 13 includes fuel injectors 16 each of which is mounted within a respective flame tube, or an annular combustion chamber, (not shown) which, in operation, is supplied with compressed air from the compressor means 12. Fuel is added in each flame tube to the compressed air to form a fuel/air mixture which is then ignited, and the combustion products, after being cooled in a well-known manner, are led to the turbine means 14 which is drivingly connected to the compressor means 12, and the exhaust gases from the turbine means 14 are expelled through the exhaust assembly 15 which includes a jet nozzle.

In FIG. 2, the flow of air is from the right to the left as shown in the drawing.

A substantially cylindrical hollow central body 21 is mounted, by means not shown, in the flame tube. As can be seen, the body 21 comprises axially consecutive parts 22, 23 and 24 which are rigidly secured together, the part 24 constituting the downstream end of the body 21. The internal cross-section of the part 22 is smaller than that of the part 23 and the internal surface 31 of the part 24 forms a continuation of the internal surface 29 of the part 23.

A fuel supply conduit 26 extends through the part 22 so as to lead fuel to a fuel feed annulus or manifold 27 in the part 23. One or more passages 28 lead tangentially from the fuel feed annulus and extend tangentially to the internal surface 29 of the part 23. It will be appreciated, therefore, that in operation fuel is directed tangentially along the internal surface 29 and the fuel will swirl as an annulus flowing in the downstream direction, that is to say, from the right to the left as seen in FIG. 2.

In flowing downstream, the annulus of fuel will pass from the internal surface 29 of the part 23 to the internal surface 31 of the part 24. As can be seen, the internal surface 31 is curved and flares radially outwardly. Moreover, the external surface 32 of the part 24 also flares radially outwardly but to a lesser extent than the internal surface 31. The two surfaces 31, 32 meet at a sharp annular edge 33.

In operation, compressed air from the compressor means 12 is supplied to the interior of the body 21 via a plurality of equiangularly spaced apart air inlet openings 34, only one of which is shown in FIG. 2. As will be appreciated, the air will thus flow inwardly of the annulus of fuel. At the edge 33, substantially all the fuel supplied to the internal surface 29 is detached from said edge by the flow of compressed air for entrainment with the latter.

Mounted to extend through, and coaxially with, the parts 22, 23 and 24 is a deflecting member 35 which comprises two oppositely tapering substantially frusto-conical portions 35a, 35c joined together by a substantially cylindrical middle portion 35b. The member 35 is secured to the central body 21 by the engagement of a nut 36 with a threaded shank 37, the latter being provided on, or secured to, the portion 35c and extending through a central axial aperture 38 in the upstream wall of the body 21.

An annular flow passage 30 is defined between the member 35 and the internal surfaces of the parts 22, 23, 24, the member 35 being adapted to deflect the flow of compressed air from the passage 30 radially outwardly of the downstream end of the internal surface 31. The portion 35a of the member 35 flares radially outwardly and at its downstream end extends for a short axial distance only beyond the radial plane containing the annular edge 33, the said distance being small compared with the total axial length of the member 35. This construction considerably reduces the possibility of fuel striking, and sticking to, the deflecting member 35 which would, of course, be undesirable.

A retaining nut 39 is connected to the parts 22, 23 and 24 and at its downstream end it is welded or otherwise secured to an outer body or shroud member 40, so as to secure together the shroud member 40 and the central body 21. A plurality of angularly spaced apart apertures 42 is provided in the nut 39 for directing a flow of compressed air towards the member 35. The shroud member 40 is fully annular and is provided with a substantially frusto-conical internal surface which terminates axially somewhat upstream of the sharp edge 33. The shroud member 40 and the external surface 32 define therebetween an annular, convergent flow passage 41. By locating the downstream edge of the shroud member 40 somewhat upstream of the sharp edge 33, the possibility of fuel jumping from the edge 33 to the shroud member 40 and sticking thereto, especially at low air flows, is substantially reduced.

In operation, compressed air flows through the openings 34 and the passage 30 so as to pass through the interior of the annulus of fuel which swirls over the internal surfaces 29 and 31. At the sharp edge 33, the flow of air deflected radially outwardly by the portion 35a of the member 35 will detach substantially all of the fuel from said edge and the mixture of fuel and air will flow, as a thin conical sheet, radially outwardly from the edge 33. This sheet will meet the flow of air issuing from the passage 41, whereby satisfactory mixing of the fuel and air and good atomisation of the fuel is achieved since the fuel is entrained between two air flows.

It will be appreciated that, owing to the tangential injection of fuel at the apertures 28, the annulus of fuel flowing downstream within the interior of the body 21 will have a high swirl or angular velocity. Unless provision is made for reducing this angular velocity before the fuel is detached from the internal surface of the body 21 for entrainment with the compressed air, the possibility arises that when the fuel is detached from the said internal surfaces, strong centrifugal forces acting on the fuel cause it to stick to the downstream-most faces of the fuel injector and thus produce less than adequate atomisation. Moreover, it will be appreciated that, if the fuel were to stick to the fuel injector, undesirable carbon deposits may occur in operation thereon. It will be further appreciated that if, in order to provide a sharp edge for fuel detachment, the internal surfaces are provided with a radially inwardly directed lip, then just upstream or this lip an increase in the angular velocity of the fuel would be produced, thereby enhancing the danger of fuel sticking.

The present invention substantially avoids these disadvantages by providing a radially outwardly flaring internal surface 31 upstream of the sharp edge 33. The internal surface 31 will direct the flow of fuel in a radially outward direction towards said edge prior to fuel detachment thereat so as to reduce the swirl or angular velocity of the fuel.

A further advantage of the provision of the radially outwardly flaring internal surface 31 is that it deflects the fuel in the desired direction even before it is detached therefrom.

Moreover, by causing the external surface 32 of the part 24 to flare radially outwardly also, the possibility of the fuel running backwards, i.e. in an upstream direction, along this surface is substantially reduced.

A still further point to be noted is that the annular flow passage 30 is of varying cross-section and the part of the passage 30 which is between the portion 35a and the internal surface 31 converges in a downstream direction. In the radial plane which contains the sharp annular edge 33, the cross-section of this part of the flow passage 30 is at its minimum and constitutes, in effect, a throat. In this way, substantially the whole of the available pressure drop is used in that location where it is most needed, namely where mixing of the fuel and air is to be initiated.

It will also be appreciated that the mixing and atomisation of the fuel is also helped by the convergence of the flow passage 41 whereby the external sheet of air will also suffer a pressure drop prior to impinging on the fuel and air mixture flowing downstream of the annular edge 33.

Yet a further advantage of the fuel injector of the present invention resides in the fact that the fuel injector will provide some atomisation of fuel even without any air flow.

Referring now to FIG. 3, the embodiment illustrated therein is similar to that of FIG. 2 and enjoys substantially the same advantages. Corresponding parts have been allotted reference numbers increased by 100, and thus the description of this figure will not be given in such detail as that of FIG. 2.

Only part of a fuel injector 116 is shown, which is symmetrical about a longitudinal centre line 101 and in which the air flow, indicated by arrows 115, is from the left to the right, as viewed.

A fuel inlet passage or aperture is provided in the body 121 so as to extend tangentially to the internal surface 129 of the body 121. A fuel supply pipe 126 communicates with the aperture 128. The pipe 126 may comprise two concentric tubes air main and pilot fuel, respectively, or it may be a single tube. In either case, it is arranged to be readily attachable to and detachable from the aperture 128, so as to facilitate mounting of the fuel injector in position. The fuel injector itself is supported from the combustion chamber. It will be appreciated, therefore, that in operation fuel is directed tangentially along the internal surface 129 and the fuel will swirl as an annulus flowing in the downstream direction, that is to say, from the left to the right as seen in the drawing.

In flowing downstream, the annulus of fuel will pass to a portion 131 of the internal surface 129 which portion 131 is curved and flares radially outwardly. Moreover, the external surface 132 of the portion 131 also flares radially outwardly but to a lesser extent than the internal surface 131. The two surfaces 131, 132 meet at a sharp annular edge 33.

Mounted to extend through, and coaxially with, the body 121 is a deflecting member 135 which comprises two oppositely tapering approximately frusto-conical portions 135a, 135b. The member 135 and the central body 121 are secured together by a plurality of struts 104, there being a nut 136 engaging with a threaded shank 137, the latter being provided on, or secured to, the portion 135b and extending through a central axial aperture 138 in the member 135.

An annular flow passage 130 is defined between the member 135 and the internal surfaces 129, 131 of the body 121, the member 135 being adapted to deflect the flow of compressed air from the passage 130 radially outwardly of the downstream end of the internal surface 131. The portion 135a of the member 135 flares radially outwardly and at its downstream end extends for a short axial distance beyond the radial plane containing the annular edge 133, the said distance being small compared with the total axial length of the member 135. This construction considerably reduces the possibility of fuel striking, and sticking to, the deflecting member 135, which would, of course, be undesirable.

The struts 104 extent radially beyond the central body 121 to an outer body or shroud member 140, which is secured to said struts 104 so as to connect the shroud member 140 to the central body 121 and to define a flow passage 141 therebetween. The shroud member 140 is fully annular and is provided at its downstream end with a substantially frusto-conical internal surface which terminates axially downstream of the annular edge 133. Owing to the shapes of the shroud member 140 and the external surface 132, the flow passage 141 converges to a minimum area at the plane which contains the edge 133. The downstream end of the shroud member 140 is provided with one or more local cowls 143 located and shaped such as to give, in operation, a spray of non-circular cross-section. A radially extending heat shield 144 is secured to the outer periphery of the shroud member 140.

In operation, similarly to the above description, compressed air flows through the passage 130 so as to pass through the interior of the annulus of fuel which swirls over the internal surfaces 129 and 131. At the sharp annular edge 133, the flow of air deflected radially outwardly by the portion 153a of the member 135 will detach substantially all of the fuel from said edge and the mixture of fuel and air will flow radially outwardly from the edge 133. At the same time, compressed air also flows through the annular passage 141, and the sheet of fuel/air mixture will meet the flow of air issuing from the passage 141 because of the shapes of the shroud member 140, central body 121 and the deflecting member 135. It is found that satisfactory mixing of the fuel and the air, and good atomisation of the fuel, is achieved since the fuel is entrained between two air flows.

I claim:

1. A fuel injector for a gas turbine engine including a hollow central body, an outer body which at least partly surrounds said central body and defines a flow passage therebetween, said flow passage and the interior of said central body being adapted to be supplied with compressed air, fuel supply means for supplying fuel to the internal surface of the central body to form an unbroken annulus of fuel flowing downstream therein with a given angular velocity, and deflecting means for deflecting the flow of compressed air from said interior in the direction of the flow of compressed air from said flow passage, said internal surface terminating in an edge at which, in operation, substantially all the fuel supplied to the internal surface is detached therefrom, the internal surface having a diameter which gradually increases in a downstream direction and being formed to direct the flow of fuel towards said edge, whereby, in operation, the angular velocity of the fuel flowing along said internal surface towards said edge is reduced.

2. A fuel injector as claimed in claim 1 wherein said deflecting means is secured to, and mounted coaxially of, said central body and defines an annular flow passage therebetween.

3. A fuel injector as claimed in claim 2 wherein the downstream end portion of said deflecting means is frusto-conical and flares radially outwardly, the part of the flow passage between said central body and said frusto-conical downstream end portion having a minimum cross-sectional area in that radial plane which contains said edge.

4. A fuel injector as claimed in claim 3 wherein said downstream end portion projects downstream of the said edge to an extent which is small compared with the total axial length of the deflecting means.

5. A fuel injector as claimed in claim 1 wherein the external surface of said central body flares radially outwardly at its downstream end.

6. A fuel injector as claimed in claim 1 wherein said central body is secured to said outer body.

7. A fuel injector as claimed in claim 1 wherein said outer body terminates at its downstream end upstream of the said edge.

8. A fuel injector as claimed in claim 1 wherein the downstream end of said outer body is downstream of said edge.

9. A fuel injector as claimed in claim 8 wherein the downstream end of said outer body is provided with at least one cowl to give, in operation, a spray of non-circular section.

10. A fuel injector as claimed in claim 1 in which the fuel supply means is arranged to direct the fuel tangentially to the said internal surface.

11. A fuel injector as claimed in claim 10 in which the fuel supply means includes a fuel pipe arranged tangentially with respect to said internal surface, said fuel pipe being readily detachable from said central body.

12. A gas turbine engine combustion chamber provided with at least one fuel injector as claimed in claim 1, said at least one fuel injector being secured to and supported from said combustion chamber.

References Cited

UNITED STATES PATENTS

| | | | |
|---|---|---|---|
| 2,595,759 | 5/1952 | Buckland | 60—39.74 |
| 2,771,744 | 11/1956 | Johnson | 60—39.74 |
| 2,920,449 | 1/1960 | Johnson | 60—39.74 |
| 2,982,099 | 5/1961 | Carlisle | 60—39.74 |
| 3,430,443 | 3/1969 | Richardson | 60—39.74 |

DOUGLAS HART, Primary Examiner